United States Patent
Luo

(10) Patent No.: US 7,512,286 B2
(45) Date of Patent: Mar. 31, 2009

(54) ASSESSING IMAGE QUALITY

(75) Inventor: Huitao Luo, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 10/694,143

(22) Filed: Oct. 27, 2003

(65) Prior Publication Data

US 2005/0089246 A1    Apr. 28, 2005

(51) Int. Cl.
  *G06K 9/36* (2006.01)
  *G06K 9/40* (2006.01)
  *G06K 9/66* (2006.01)

(52) U.S. Cl. .................. 382/286; 382/190; 382/254

(58) Field of Classification Search ............ 382/167, 382/168, 118, 254, 190, 286; 358/518, 1.9
See application file for complete search history.

(56) References Cited

U.S. PATENT DOCUMENTS

| | | | |
|---|---|---|---|
| 5,400,667 A | | 3/1995 | Feng et al. |
| 6,243,492 B1 * | | 6/2001 | Kamei .................. 382/181 |
| 6,285,797 B1 | | 9/2001 | Lubin et al. |
| 6,556,196 B1 * | | 4/2003 | Blanz et al. ............. 345/419 |
| 6,798,919 B2 * | | 9/2004 | Ali et al. ................. 382/272 |
| 6,992,697 B2 * | | 1/2006 | Ali ........................ 348/189 |
| 7,068,841 B2 * | | 6/2006 | Luo ........................ 382/167 |
| 2002/0171852 A1 | | 11/2002 | Zhang et al. |
| 2003/0128876 A1 | | 7/2003 | Yamaguchi |

FOREIGN PATENT DOCUMENTS

WO  WO 01/33497  5/2001

OTHER PUBLICATIONS

H. Rowley, S. Baluja and T. Kanade, "Neural network-based face detection," IEEE PAMI, vol. 20, pp. 22-38, 1998.
P. Viola and M. Jones, "Robust Real-time Object Detection," ICCV, Vancouver, Canada, 2001.
N.B. Nill and B.H. Bouzas, "Objective image quality measure derived from digital image power spectra", Optical Engineering, vol. 31, pp. 813-825.
Chen et al., "Image quality measurement based on the statistics of activity regions," Journal of the Chinese Institute of Engineers, vol. 24, No. 3, pp. 379-388 (2001).
M. D. Adams and F. Kossentini, Reversible Integer-to-Integer Wavelet Transforms for Image Compression: Performance Evaluation and Analysis, IEEE Trans. on Image Processing, vol. 9, No. 6, pp. 1010-1024 (Jun. 2000).
K. Sobottka and I. Pitas, "Looking for faces and facial features in color images," Pattern Recognition and Image Analysis: Advances in Mathematical Theory and Applications, Russian Academy of Sciences, 29 pages (1996).

* cited by examiner

*Primary Examiner*—Aaron W Carter

(57) ABSTRACT

Systems and methods of assessing image quality are described. In one scheme for assessing image quality, a target object region is detected in an input image. An image quality feature vector representing the target object region in an image quality feature space is generated. The image quality feature vector is mapped to a measure of image quality. In one scheme for generating an image quality assessment engine, target object regions are detected in multiple input images. Image quality feature vectors representing the target object regions in an image quality feature space are generated. The image quality feature vectors are correlated with respective measures of image quality assigned to the input images. A mapping between image quality feature vectors and assigned measures of image quality is computed.

38 Claims, 4 Drawing Sheets

ASSESSING IMAGE QUALITY

TECHNICAL FIELD

This invention relates to systems and methods of assessing image quality.

BACKGROUND

Methods of assessing image quality are used in many different image processing applications. For example, image quality measurements may be used to optimize and automatically adjust algorithms and parameter settings in components of an image processing system, such as pre-processing and post-processing components of a camera or a video teleconferencing system. Image quality assessment methods also may be used to determine which of multiple imaging systems is best for a particular imaging task.

Although person-based subjective image quality assessment methods are used for some applications, these methods tend to be too slow and expensive for most applications. For this reason, objective image quality assessment methods have been developed to automatically predict human subjective assessments of image quality. Peak Signal-to-Noise Ratio (PSNR) and Mean Squared Error (MSE) are commonly used in automatic objective image quality assessment approaches. In some approaches, a test video sequence is compared to a reference copy of the same sequence to assess the quality of the test video sequence. Such a reference-based approach often accurately and robustly predicts human subjective assessments of video quality. In many applications, however, a reference copy of the image or video sequence is not readily available for performing a comparative image quality assessment. For example, in consumer digital imaging applications, such as browsing and managing large image databases, key frame selection for video, and automatic photo layout design, reference images are not available.

SUMMARY

The invention features systems and methods of assessing image quality.

In one aspect, the invention features inventive systems and methods of assessing image quality. In accordance with these inventive systems and methods a target object region is detected in an input image. An image quality feature vector representing the target object region in an image quality feature space is generated. The image quality feature vector is mapped to a measure of image quality.

In another aspect, the invention features inventive systems and methods of generating an image quality assessment engine. In accordance with these inventive systems and methods, target object regions are detected in multiple input images. Image quality feature vectors representing the target object regions in an image quality feature space are generated. The image quality feature vectors are correlated with respective measures of image quality assigned to the input images. A mapping between image quality feature vectors and assigned measures of image quality is computed.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In general, the image quality assessment embodiments described herein may be incorporated into any system or method in which such functionality is desired, including embedded environments, which typically have limited processing and memory resources. These systems and methods assess image quality based on one or more target object regions that are detected within an image. These regions encompass objects that typically are selected to be particularly relevant to a person's subjective assessment of image quality. For example, in some implementations, the target object region corresponds to a human face, the appearance of which typically dominates a person's subjective assessment of the quality of an image. In addition, such a target object also may be detected based on objective measurements (e.g., low-frequency spectral image components) that are different from the measurements that may be used to objectively assess image quality (e.g., high-frequency spectral image components). In this way, the target object region detection process may be substantially decoupled from the image assessment process, improving the accuracy of the image quality assessment results.

Figure 1:
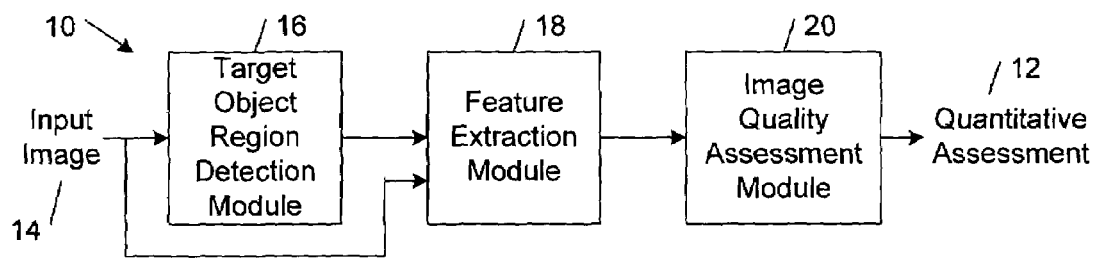
FIG. 1 is a block diagram of an embodiment of an image quality assessment system.

FIG. 1 shows an embodiment of an image quality assessment system 10 that is configured to generate a quantitative assessment 12 of the quality of an input image 14. Image quality assessment system 10 includes a target object region detection module 16, a feature extraction module 18, and an image quality assessment module 20. In general, the target object region detection module 16, the feature extraction module 18, and the image quality assessment module 20 are not limited to any particular hardware or software configuration, but rather they may be implemented in any computing or processing environment, including in digital electronic circuitry or in computer hardware, firmware, a device driver, or software. For example, in some implementations, these modules 16-20 may be embedded in the hardware of any one of a wide variety of electronic devices, including digital cameras, printers, and portable electronic devices (e.g., mobile phones and personal digital assistants).

The input image 14 may include any type of image content, including a logo (e.g., a company logo), graphics, pictures, text, images, or any pattern that has visual significance. The image content may appear in border regions, the foreground, or the background of input image 14. The image content also may be in the form of a binary image (e.g., a black and white dot pattern), a multilevel image (e.g., a gray-level image), or a multilevel color image. The input image 14 may be produced by any digital image formation process or apparatus, including a digital still image camera, a digital video camera, a bitmap graphics engine, a vector graphics engine, and a scanner, such as a conventional desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), or a conventional facsimile machine.

Figure 2:
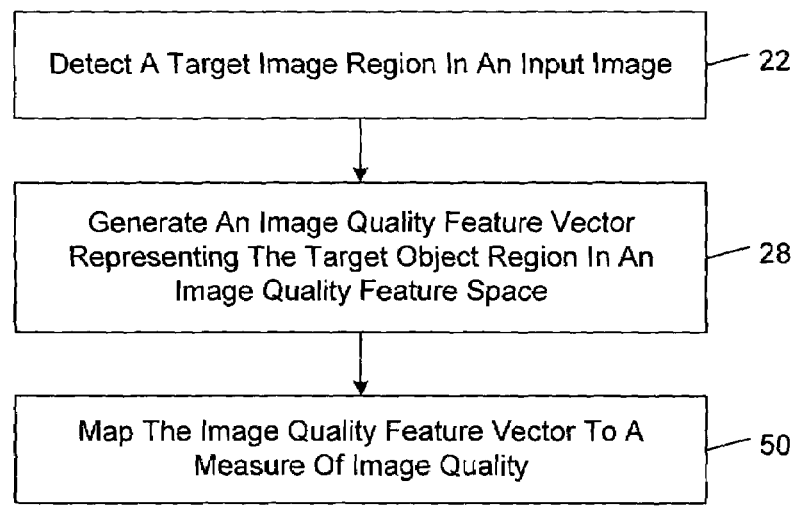
FIG. 2 is a flow diagram of an embodiment of a method of assessing image quality.
Figure 3:
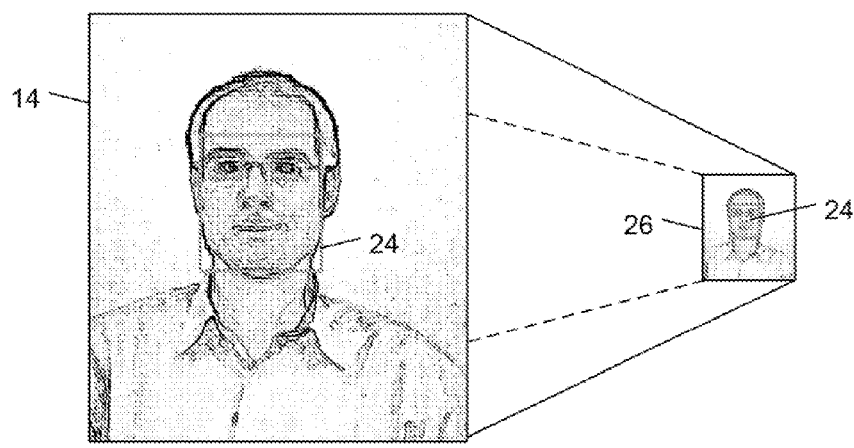
FIG. 3 is a diagrammatic view of an input image and a sub-sampled version of the input image.

Referring to FIGS. 1, 2 and 3, in some implementations, image quality assessment system 10 generates the quantitative assessment 12 of the quality of input image 14 as follows.

Target object region detection module 16 automatically detects regions in input image 14 that encompasses a target object appearing in input image 14 (step 22). In some implementations, the appearance of the target object in the input image 14 has a high likelihood of dominating a person's subjective assessment of the overall quality of the input image. For example, the target object may correspond to the primary subject of the input image 14. In a consumer imaging application environment, people typically are the primary subjects of images. Accordingly, in such an application environment, at least one detectable aspect of a person may be selected as the target object. In one exemplary implementation for this application environment, the target object is a human face. In other application environments, different target objects and, therefore different corresponding detection algorithms, may be used. For example, in a botanical application environment, the target object may correspond to one or more features of plants, such as, flowers or leaves. In an architectural application environment, the target object may correspond to one or more features of buildings. Target object region detection module 16 may be tailored specifically for one or more respective application environments.

Referring to FIG. 3, in one exemplary implementation suitable for use in a consumer imaging application environment, target object region detection module 16 automatically detects in input image 14 a target object region 24 corresponding to at least a portion of a human face. In general, target object region detection module 16 may implement any one of a wide variety of different face detection methods, including feature-based face detection methods and neural-network-based face detection methods. An exemplary feature-based face detection approach is described in Viola and Jones, "Robust Real-Time Object Detection," Second International Workshop of Statistical and Computation theories of Vision—Modeling, Learning, Computing, and Sampling, Vancouver, Canada (Jul. 13, 2001), which is incorporated herein by reference. An exemplary neural-network-based face detection method is described in Rowley et al., "Neural Network-Based Face Detection," IEEE Transactions on Pattern Analysis and Machine Intelligence, Vol. 20, No. 1 (January 1998), which is incorporated herein by reference.

Figure 4A:
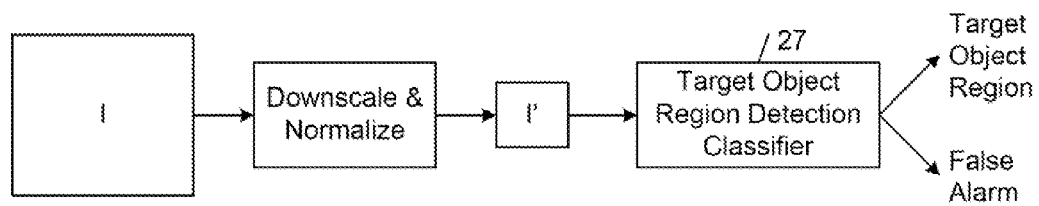
FIG. 4A is a flow diagram of information flow in an embodiment of a method of classifying an image region.

Referring to FIG. 4A, in some of these implementations, a target object region detection classifier 27 is trained with respect to an image template with a fixed size. For example, in one exemplary implementation, the template size is a square 18 pixels wide by 18 pixels high. FIG. 4A shows an exemplary process for determining if an image region I, which typically is bigger than the predefined image template, corresponds to the target object region. In this process, the image region I is downscaled to the template size. The image region I may be downscaled in accordance with a standard image sub-sampling process. The downscaled image region is normalized (e.g., histogram normalized) to produce an image region I' corresponding to the image template. Image region I' is sent to a pre-trained classifier which classifies the image region I' as either a target object region or a false alarm. In some implementations, only the final, downscaled and normalized image region I' determines the object detection result. In addition, because of the downsampling process, the mapping from the original image region I to I' is not one-to-one. Therefore, not all of the signal features of I are maintained in the mapping from I to I' and only a fraction of the signal features of the original image region I is used to classify the region as a target region or a false alarm.

Figure 4B:
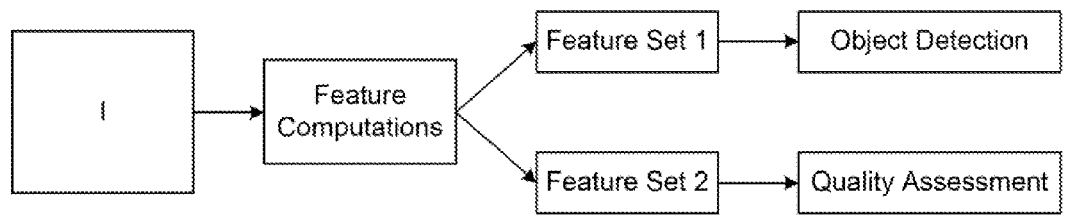
FIG. 4B is a flow diagram of information flow in an embodiment of a method of assessing image quality.

As shown diagrammatically in FIG. 4B, in some embodiments, the signal features (Feature Set 1) of image region I that are used for object detection are substantially decoupled from (e.g., orthogonal to) the features (Feature Set 2) of image region I that are used to assess image quality. In the embodiment of FIG. 4A, the downscaling process corresponds to a low-pass filter. Accordingly, the features used for object detection (Feature Set 1) contain primarily the low-frequency spectrum components of the input image region I. For this reason, in some embodiments, the high-frequency components of the image region I are used as primary features for quality assessment.

Referring back to FIGS. 1 and 2, in some implementations, the target object region detection module 16 up-samples the detected target object region 24 from the resolution of the sub-sampled image 26 to the original resolution of the input image 14. In the illustrated embodiment, the output of the target object region detection module 16 is the location of the target object region 24 in the input image 14.

Figure 5:
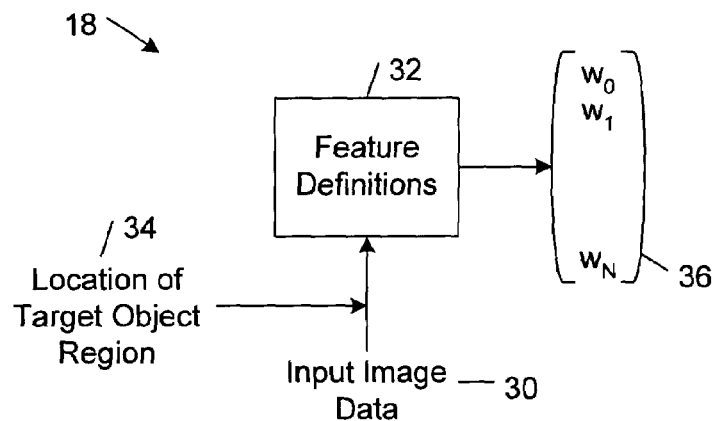
FIG. 5 is a diagrammatic view of an implementation of the feature extraction module shown in FIG. 1.

Feature extraction module 18 generates an image quality feature vector that represents the target object region in a predefined image quality feature space (step 28). FIG. 5 shows an embodiment in which input image data 30 is projected into a feature space in accordance with a set of feature definitions 32. Input image data 30 includes any information relating to the input image 14, including color values of input image pixels, the location 34 of the target object region 24 in the input image 14, and other information derived from the input image 14 that is needed to compute feature weights. Each feature is defined by a rule that described how to compute or measure a respective weight ($w_i$, where i has an integer value ranging from 0 to N) for a target object region 24 that corresponds to the contribution of the feature to the representation of the target object region 24 in the feature space spanned by the set of features 32. The set of weights computed for a target object region 24 constitutes a feature vector 36.

Figure 6:
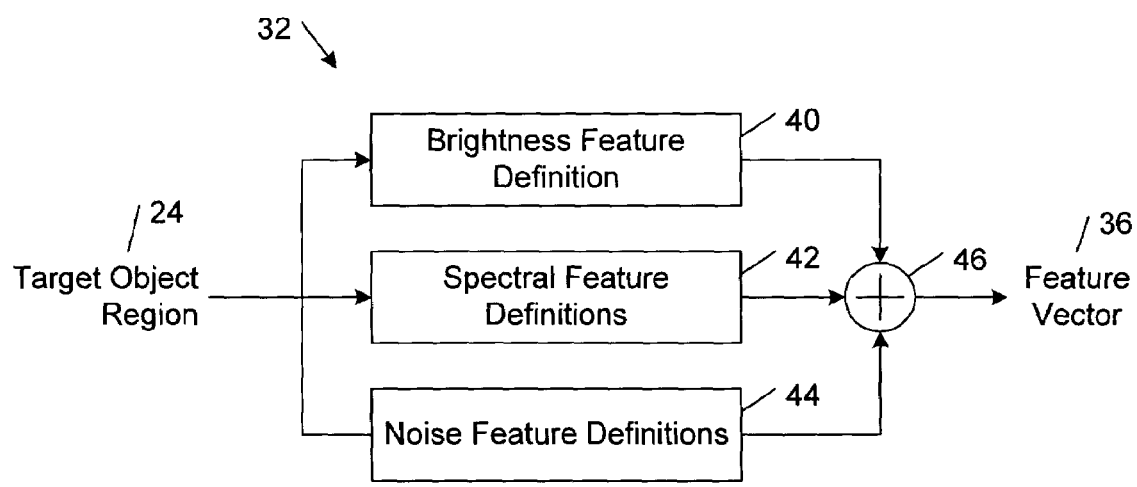
FIG. 6 is a diagram of information flow in an embodiment of a method of generating a feature vector representing a target object region in an image quality feature space.

FIG. 6 shows a diagram of information flow in an embodiment of a method of generating a feature vector 36 for target object region 24 in an implementation of the feature extraction module 18. In this embodiment, some of the weights in the feature vector 36 are computed based on a spectral analysis of the target object region 24. In particular, in the illustrated embodiment, the feature vector is computed by projecting the target object region onto a set of feature definitions 32, including a brightness feature definition 40, a set of at least one spectral feature definition 42, and a set of one or more noise feature definitions 44.

In an exemplary implementation of a face-detection-based image quality assessment system 10, a ten-dimension feature vector is computed for each detected target face region. The feature vector includes a brightness (DC) component, seven spectral components, and two noise components.

In some embodiments, the DC component ($w_0$) and the spectral components ($w_1, w_2, \ldots, w_7$) are obtained from a frequency domain transformation of the detected face region. The frequency domain transformation may correspond to any one of a wide variety of different frequency domain transformations, including a wavelet decomposition transformation and a discrete cosine transformation. In one exemplary implementation, the DC and spectral components are computed based on a wavelet decomposition of the detected face region. The wavelet decomposition may be performed on the detected face region directly, or it may be performed on an image plane derived from the detected face region, such as a grayscale representation of the detected face region or a particular color plane of the detected face region (e.g., the L plane in a CIE Lab color space representation of the detected face region). A two-level, decimated 5/3 wavelet decomposition is used to decompose the detected face region in to seven sub-bands (see, e.g., M. D. Adams and F. Kossentini, "Reversible Integer-to-integer wavelet transforms for image compression: performance evaluation and analysis," IEEE Trans. on Image Processing, vol. 9, no. 6, 2000, which is incorporated herein by reference). Each of the spectral components of the feature vector 36 corresponds to an estimate of the power in a respective sub-band of the wavelet decomposition. For example, in one implementation, the power in a given sub-band may correspond to the sum of the squared coefficients in the given sub-band.

The noise components may be computed based on any measure of image noise. For example, a noise component of feature vector 36 may estimated directly from the detected face region or may be estimated based on an analysis of the spatial distribution of high-frequency features of the detected face region.

One exemplary noise component is estimated directly from the detected face region based on a window that is positioned at multiple locations over the detected face region. In one exemplary implementation, the detected face region is a square region d pixels in height by d pixels in width, and the window is a square region s pixels in height by s pixels in width, where s=d/5. At each location, the grayscale standard deviation is computed. The smallest of the computed standard deviations is denoted "minDev". The location corresponding to minDev is filtered by a Gaussian low-pass filter, and the grayscale standard deviation of the filtered image region is computed and denoted "lowDev". The noise component ($w_8$) of feature vector 36 is computed by equation (1):

$$w_8 = \sqrt{\frac{minDev + m}{lowDev + m}} \qquad (1)$$

where m is a small constant that is used to avoid singularities.

Another exemplary noise component is computed based on an analysis of the spatial distribution of high-frequency features of the detected face region. In one exemplary implementation, the noise component is an estimate of the spatial homogeneity of the high-frequency components of the above-described wavelet decomposition. This noise measure distinguishes high fidelity images from noisy images because, although both types of images have substantial high-frequency signal power, the spatial distributions of high-frequency features are different. For example, the high-frequency features of a noisy image tend to be uniformly distributed, whereas the high-frequency features of a high-fidelity face region tend to be concentrated at the locations of facial features, such as the eyes and mouth. In one implementation, spatial homogeneity is measured by thresholding each high-frequency sub-band signal to produce a binary image. A window (e.g., an s×s square window) is positioned at each pixel location (i,j) in the detected face region. The standard deviation (Dev(i,j,s)) is computed at each window location s. The spatial distribution noise component ($w_9$) is computed by equation (2):

$$w_9 = \sum_S \sum_J \sum_I Dev(i, j, s) \qquad (2)$$

where I, J, and S are the respective ranges of i, j, and s.

The computed feature weights ($w_0, w_1, \ldots, w_N$) are combined 46 to form the computed feature vector 36 (step 46; FIG. 6).

Referring back to FIGS. 1 and 2, the feature vector 36 is input into the image quality assessment module 20, which maps the image quality feature vector to a quantitative measure of image quality (step 50). In some embodiments, the image quality assessment module 20 is a machine learning based classification engine that captures the functional relationship between the computed feature vector 36 and quantitative assessments assigned to a set of training images by a human expert (or administrator), as explained in detail below in connection with FIGS. 7 and 8. Any of a wide variety of different machine learning methods may be used to generate image quality assessment engine 20, including direct function approximation (or interpolation) methods and statistical distribution estimation methods.

In one exemplary direct function approximation based approach, image quality assessment module 20 implements a radial basis function (RBF) based machine learning method. In this implementation, a function F is defined to map the feature vector $V=\{w_0, w_1, \ldots, w_9\}$ of an object region to its quality assessment value g as $$g = F(V) \qquad (3)$$

In this RBF embodiment, a radial basis function network is modeled to approximate the unknown mapping function F in a standard way (see, e.g., I. Nabney, "Netlab: Algorithms for Pattern Recognition," Springer Verlag; 1st edition (Nov. 28, 2001), which is incorporated herein by reference).

In one exemplary statistical distribution estimation method, image quality assessment method 20 implement a mixture of Gaussian based machine learning method. In this implementation, a feature vector is defined as the combination of the input and output of the previous mapping function F:

$$V' = \{g, w_0, w_1, \ldots, w_9\} \qquad (4)$$

The distribution of the feature vector V' is modeled using a standard mixture of Gaussians model (see, e.g., I. Nabney, "Netlab: Algorithms for Pattern Recognition," Springer Verlag; 1st edition (Nov. 28, 2001)). For example, in some implementations, the distribution of the feature vector V' is modeled by a function G and the quality assessment value $g_0$ is computed as follows:

$$g_0 = \underset{g=1,2,3,4,5}{\operatorname{argmax}}(G(g, f_1, f_2, \ldots, f_n)) \quad (5)$$

In the formulation expressed in equation (5), g is assumed to be one out of five integer values. In general, the number of values that may be assigned to the variable g corresponds to the number of possible image assessment values.

Figure 7:
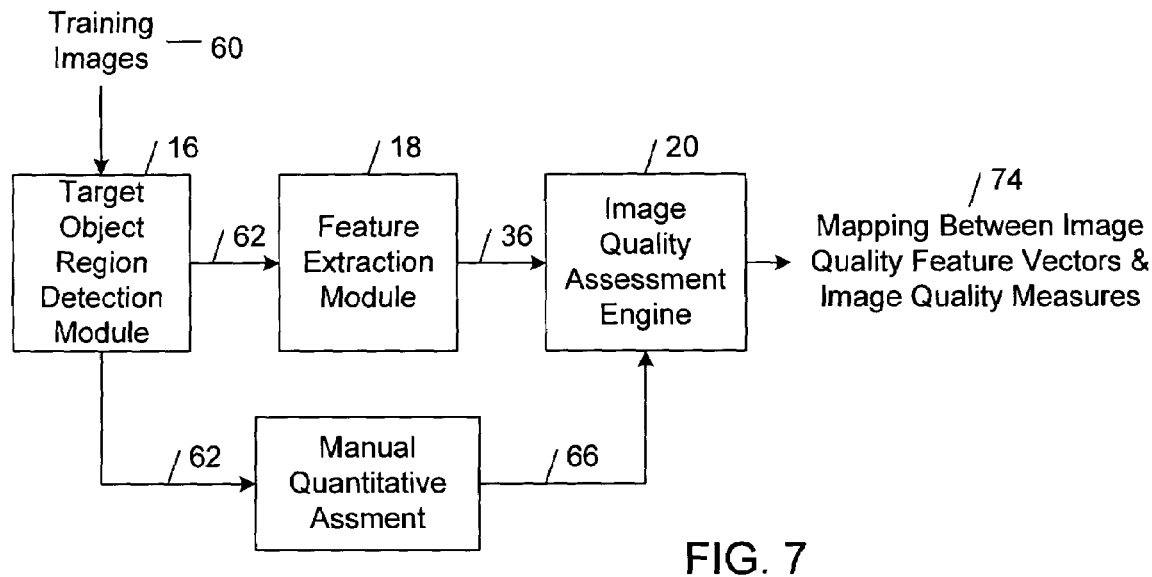
FIG. 7 is a block diagram of an embodiment of a system for generating an image quality assessment engine.
Figure 8:
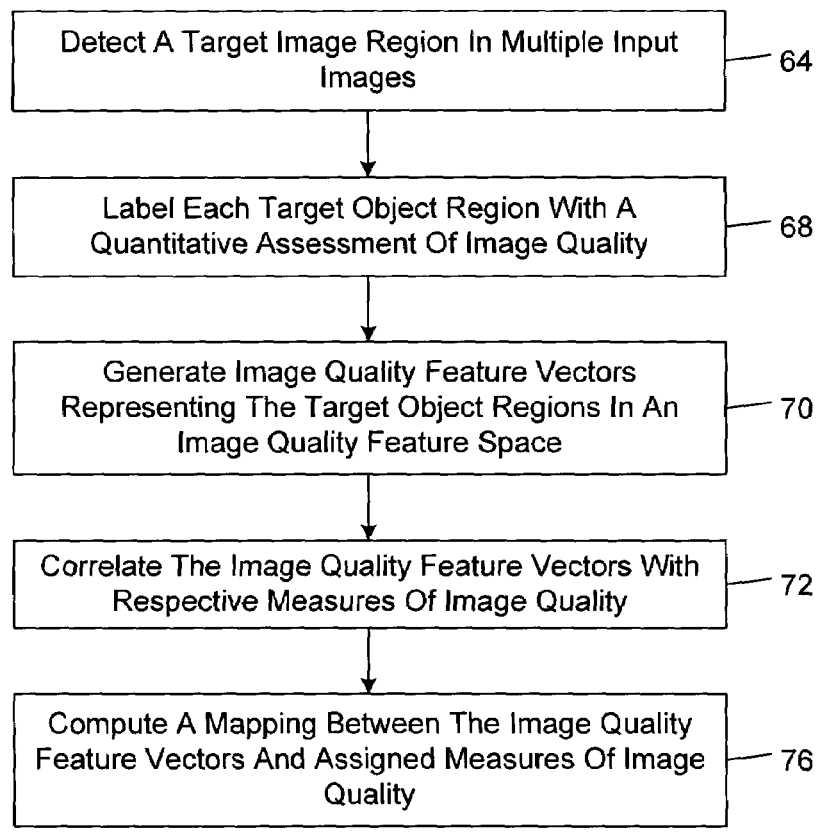
FIG. 8 is a flow diagram of an embodiment of a method of generating an image quality assessment engine.

Referring to FIGS. 7 and 8, in some implementations, image quality assessment module 20 is trained as follows. Training images 60 are first processed by the target object region detection module 16 to generate a set of detected target object regions 62 (step 64). Each target object region 62 is labeled manually by a human expert (or administrator) with a quantitative assessment 66 of the quality of the detected target object region (step 68). In one exemplary embodiment, each target object region is assigned a quality score with a value in the range of 1 to 5, where a higher quality score corresponds to a higher image quality. A feature vector 36 is computed for each detected target object region (step 70). The resulting training data 36, 66 are sent to a machine learning model 204 to train the final image quality assessment module 20, which correlates the image quality feature vectors 36 with respective measures 66 of image quality (step 72). During training, the image quality assessment module 20 computes a mapping 74 between the image quality feature vectors and the image quality measures 66 (step 76). This mapping 74 is used to automatically assess image quality in the embodiment of FIG. 5.

Other embodiments are within the scope of the claims.

The systems and methods described herein are not limited to any particular hardware or software configuration, but rather they may be implemented in any computing or processing environment, including in digital electronic circuitry or in computer hardware, firmware, or software. The systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A method of assessing image quality, comprising operating a computer processor to perform operations comprising:

detecting a target object region in an input image, wherein the detecting is performed on image data derived solely from the input image without regard to image data derived from any image other than the input image and the detecting comprises determining that the target object region comprises a target object;

generating an image quality feature vector representing the target object region in an image quality feature space, wherein the generating comprises generating the image quality feature vector from image data derived solely from the input image without regard to image data derived from any image other than the input image;

mapping the image quality feature vector to a measure of image quality based on a classification model that correlates image quality feature vectors with respective image quality values; and outputting a quantitative assessment of quality of the input image based on the measure of image quality.

2. The method of claim 1, wherein the detecting comprises detecting a human face in the input image.

3. The method of claim 1, wherein the detecting comprises detecting an object relevant to a person's subjective assessment of image quality in the input image.

4. The method of claim 1, wherein the detecting comprises detecting the target object region based on a sub-sampled version of the input image.

5. The method of claim 4, wherein the generating comprises generating the image quality feature vector based on a version of the target object region at a resolution of the input image.

6. The method of claim 1, wherein the detecting comprises detecting the target object region based on a first set of features of the input image, and the generating comprises generating the image quality feature vector based on a second set of features of the input image different from the first set of features.

7. The method of claim 6, wherein the first set of features is substantially decoupled from the second set of features.

8. The method of claim 1, wherein the image quality feature space is spanned by multiple features including at least one brightness feature describing a respective brightness characteristic of the target object region.

9. The method of claim 1, wherein the image quality feature space is spanned by multiple features including at least one spectral feature describing a respective spatial frequency characteristic of the target object region.

10. The method of claim 9, wherein generating the image quality feature vector comprises decomposing the target object region into multiple wavelet transform sub-bands.

11. The method of claim 10, wherein each spectral feature describes energy in a respective wavelet transform sub-band.

12. The method of claim 1, wherein the image quality feature space is spanned by multiple features including at least one noise feature describing a respective noise characteristic of the target object region.

13. The method of claim 12, wherein the generating comprises computing the noise feature based on a measure of noise in the target object region.

14. The method of claim 12, wherein the generating comprises computing the noise feature based on a measure of spatial homogeneity of spectral features each describing a respective spatial frequency characteristic of the target image region.

15. The method of claim 1, wherein the mapping comprises mapping the image quality feature vector to a measure of image quality in accordance with a machine learning based classification process.

16. The method of claim 15, wherein the mapping comprises mapping the image quality feature vector to a measure of image quality in accordance with a radial basis function based machine learning process.

17. The method of claim 15, wherein the mapping comprises mapping the image quality feature vector to a measure of image quality in accordance with a mixture of Gaussian based machine learning process.

18. A system for assessing image quality, comprising computing hardware operable to perform operations comprising:
   detecting a target object region in an input image based on image data derived solely from the input image without regard to image data derived from any image other than the input image, wherein in the detecting the computing hardware is operable to perform operations comprising determining that the target object region comprises a target object;
   generating an image quality feature vector representing the target object region in an image quality feature space based on image data derived solely from the input image without regard to image data derived from any image other than the input image;
   mapping the image quality feature vector to a measure of image quality based on a classification model that correlates image quality feature vectors with respective image quality values; and
   outputting a quantitative assessment of quality of the input image based on the measure of image quality.

19. The system of claim 18, wherein in detecting the target object region the target object region detection module performs a human face detection process on the input image.

20. The system of claim 18, wherein the feature extraction module detects the target object region based on a sub-sampled version of the input image.

21. The system of claim 18, wherein the image quality feature space is spanned by multiple features including at least one brightness feature describing a respective brightness characteristic of the target object region.

22. The system of claim 18, wherein the image quality feature space is spanned by multiple features including at least one spectral feature describing a respective spatial frequency characteristic of the target object region.

23. The system of claim 22, wherein the feature extraction module is operable to generate the image quality feature vector by decomposing the target object region into multiple wavelet transform sub-bands.

24. The system of claim 23, wherein each spectral feature describes energy in a respective wavelet transform sub-band.

25. The system of claim 18, wherein the image quality feature space is spanned by multiple features including at least one noise feature describing a respective noise characteristic of the target object region.

26. The system of claim 25, wherein the feature extraction module computes the noise feature based on a measure of noise in the target object region.

27. The system of claim 25, wherein the feature extraction module computes the noise feature based on a measure of spatial homogeneity of spectral features each describing a respective spatial frequency characteristic of the target image region.

28. The system of claim 18, wherein the image quality assessment module maps the image quality feature vector to a measure of image quality in accordance with a machine learning based classification process.

29. The system of claim 28, wherein the image quality assessment module maps the image quality feature vector to a measure of image quality in accordance with a radial basis function based machine learning process.

30. The system of claim 28, wherein the image quality assessment module maps the image quality feature vector to a measure of image quality in accordance with a mixture of Gaussian based machine learning process.

31. A computer-readable medium storing computer-readable instructions for causing a computer to perform operations comprising:
   detecting a target object region in an input image based on image data derived solely from the input image without regard to image data derived from any image other than the input image, wherein in the detecting the computer-readable instructions cause the computer to perform operations comprising determining that the target object region comprises a target object;
   generating an image quality feature vector representing the target object region in an image quality feature space based on image data derived solely from the input image without regard to image data derived from any image other than the input image; and
   mapping the image quality feature vector to a measure of image quality based on a classification model that correlates image quality feature vectors with respective image quality values; and
   outputting a quantitative assessment of quality of the input image based on the measure of image quality.

32. A method of generating an image quality assessment engine, comprising operating a computer processor to perform operations comprising:
   for each of multiple input images
      detecting a respective target object region in a respective one of the input images based on image data derived solely from the respective input image without regard to image data derived from any image other than the respective input image, wherein the detecting comprises determining that the target object region comprises a target object, and
      generating a respective image quality feature vector representing the respective target object region in an image quality feature space, wherein the generating comprises generating the respective image quality feature vector from image data derived solely from the respective input image without regard to image data derived from any image other than the respective input image;
   correlating the image quality feature vectors with respective measures of image quality assigned to the input images;
   determining a mapping between image quality feature vectors and the assigned measures of image quality; and
   storing the mapping as computer-readable instructions on a computer-readable medium.

33. The method of claim 32, wherein for each respective one of the input images the detecting comprises detecting a human face in the respective input image.

34. The method of claim 32, wherein the image quality feature space is spanned by multiple features including at least one brightness feature describing a respective brightness characteristic of the target object region.

35. The method of claim 32, wherein the image quality feature space is spanned by multiple features including at least one spectral feature describing a respective spatial frequency characteristic of the target object region.

36. The system of claim 18, wherein the computing hardware comprises a computer-readable storage medium and a computer processor.

37. The method of claim 1, wherein the determining comprises classifying each of multiple regions of the input image into one of a target object region class and a false alarm class.

38. The method of claim 1, wherein the classification model captures a functional relationship between the image quality feature vectors and quantitative assessments of image quality assigned to training images.

* * * * *